Figure 1:
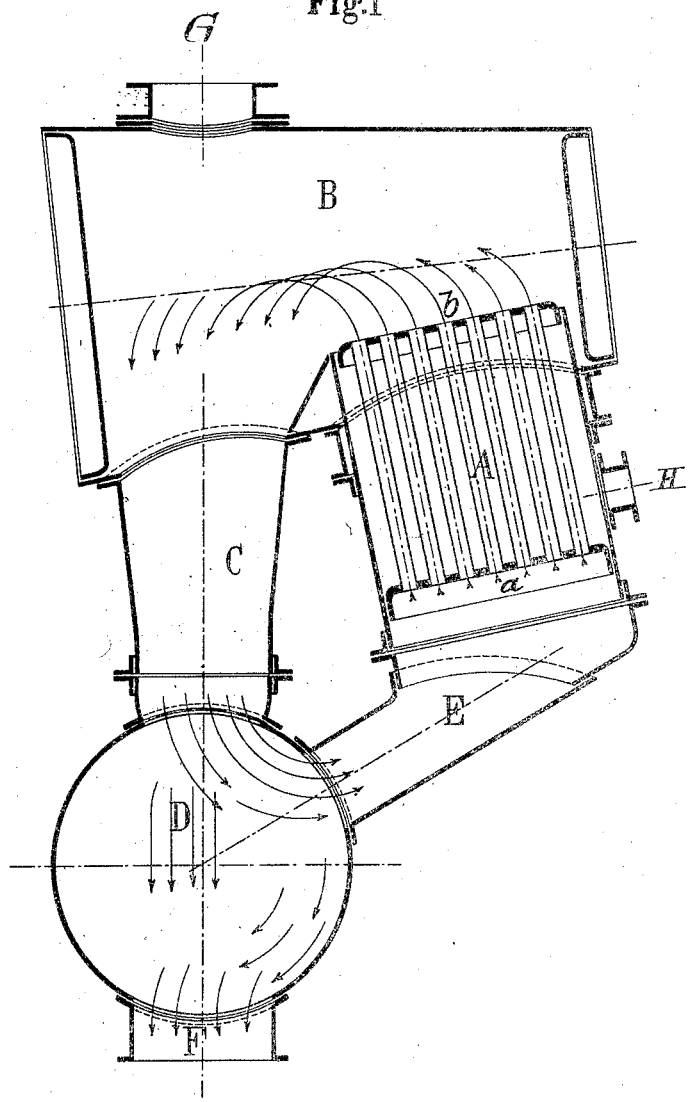

O. FALLER.
EVAPORATOR.
APPLICATION FILED JAN. 2, 1906.

907,109.

Patented Dec. 15, 1908.
2 SHEETS—SHEET 1.

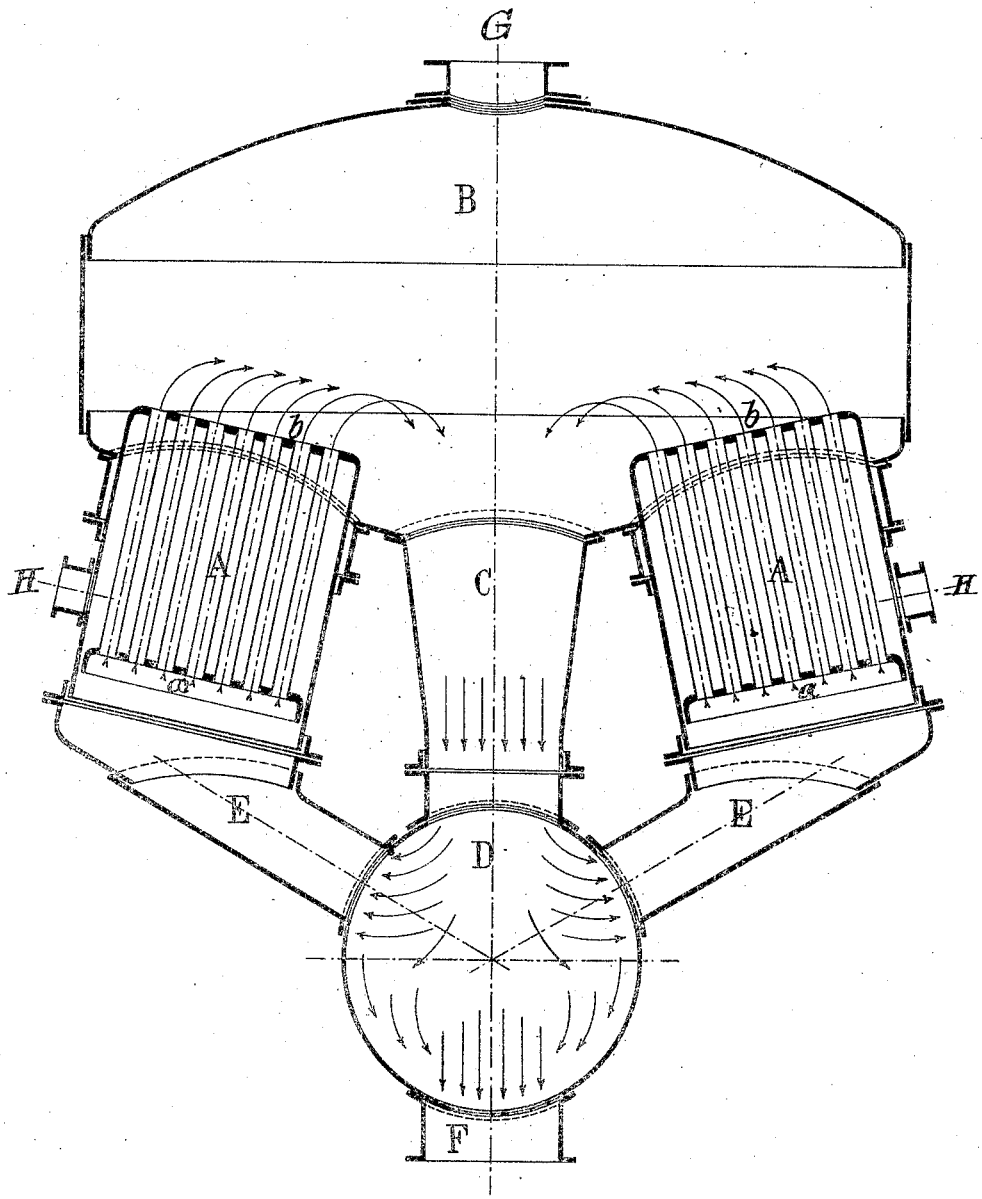

UNITED STATES PATENT OFFICE.

OSCAR FALLER, OF BASEL, SWITZERLAND.

EVAPORATOR.

No. 907,109.

Specification of Letters Patent.

Patented Dec. 15, 1908.

Application filed January 2, 1906. Serial No. 294,241.

*To all whom it may concern:*

Be it known that I, OSCAR FALLER, a citizen of the Republic of Switzerland, residing at No. 53 Thiersteiner Allee, Basel, in the Canton of Basel, Switzerland, engineer and merchant, have invented a new and useful Improvement in Evaporators, of which the following is a specification.

The present invention relates to evaporators and particularly to an apparatus for the boiling of impure liquids or of such liquids as deposit mud, scale or solid substances of any kind during boiling.

The invention is especially suitable for the treatment of cellulose preparations.

The apparatus consists essentially of an upper and a lower receptacle (which may have any desired form) and of a heating vessel composed of a casing or cylinder adapted to contain the heating fluid and having heating tubes arranged at an acute angle to the perpendicular, the upper and lower ends whereof are connected to the aforesaid receptacles in such a manner that an uninterrupted circulation of the liquid is produced, the liquid rising from the lower receptacle through the tubular heater into the upper receptacle, and descending again through a return pipe to the lower receptacle. As a further precaution against the choking of the heating tubes by sediment, the upper end of the heater is caused to project appreciably within the upper receptacle.

It is moreover a feature of this apparatus that only small quantities of liquid come into contact at any time with the tubular heating vessel and that these are therein heated and expanded and consequently ascend. The steam bubbles occurring in this ascending freshly heated current of liquid, which contains in it the impurities or solids separated on heating or on the formation of steam, are consequently carried upward with the current at an angle corresponding to the inclination of the tubes and do not rise vertically upwards over the heating vessel. On the contrary the aforesaid steam bubbles having acquired during their ascent a sloping direction, due principally to the inclined position of the heating tubes, when they burst the impurities or solids contained in the thick liquid are separated, and tend (in consequence of their greater specific weight) to sink, but they are prevented by the sloping position of the tubes and the sidewise inclination of the current from depositing themselves upon the heating surfaces, and they are carried further by the return current until they collect in the specially provided lower collecting receptacle. By this means the furring up or choking of the heating tubes is prevented. That portion of the apparatus in which the circulating liquid descends is constructed wide enough to cause the speed of the flow to be very slight, and at that point no new addition of heat takes place, but on the contrary there is a certain amount of cooling. The separated substances have therefore plenty of opportunity to sink to the bottom of the lower receptacle and to collect there. As the approach to the heating surfaces lies above the place where the collecting of the sediment takes place, the liquid passing to the heating surfaces is continuously freed from solid deposits, so that no choking of the tubular heating apparatus can take place.

The drawing illustrates the invention in two constructional modifications.

Figure 1 shows a vertical section through a boiler provided with a heater of the kind above set forth. Fig. 2 shows a vertical section through a similar vessel having two heaters arranged opposite to each other.

The heating vessel A (Fig. 1) comprises a group of heating tubes arranged parallel and at an acute angle with regard to the perpendicular. For the purpose of the heating, these tubes are inclosed in a casing within which the heating fluid (steam, fire gases and so forth) is caused to circulate. The complete apparatus consists of the lower receptacle and collecting tank D, the sloping tubular channel E, the jacketed heater A, the upper receptacle B the liquid inlet G, the heating fluid inlets H and the tapering return pipe C. The liquid under treatment circulates successively through these receptacles, passing upwards from D to E thence entering the heating tubes A at *a* and escaping therefrom at the upper ends *b* of said tubes into the upper receptacle B; the return flow of the liquid is through the return pipe C downwards into the collecting tank D, in which the solid materials gravitate towards the outlet F, while the liquid again commences to ascend through the channel E. In the upper receptacle B the steam bubbles rising from the heated liquid emerging from the tubes of the heating vessel A are impelled sidewise, partly through the sidewise circulation of the liquid, and partly by reason of the sloping position of the heating tubes.

The circulation is indicated in the drawing by means of the arrows. Moreover the heater A is arranged to project into the receptacle B, thereby insuring that no cooling effect can take place at the orifices of the heating tubes. The large tapering return pipe C serves as a connecting support between the upper receptacle B and the lower receptacle D, which latter acts as collector for the separated solid particles or sediment. The deposited substances are removed from the apparatus from time to time through the outlet F. Finally the lower receptacle D is connected to the lower ends of the tubes in the heater A by means of the tube E, inclined at an angle opposite to that of the heating tubes.

The primary object of the connection E is to serve as the uptake for the pipes A and this function may be effected by varying the shape of the connection E or even by enlarging the receptacle D so as to obtain a direct connection with its upper side orifice and the pipes A thus substantially eliminating the part E, or in any other sitable manner.

In the constructional modification illustrated in Fig. 2 the parts A and E are constructed in duplicate. The arrangement of each separate heater is identical with that described with reference to Fig. 1. The operation of this construction is as follows: The liquid rising through the tubes of the heaters A flows up into the receptacle B at an angle to the perpendicular as already explained and descends through the centrally arranged connecting tube C, thus reaching again the lower receptacle D, in which the precipitates or solids separated throughout the whole heating operation and circulation collect, and can be removed without coming into contact with the heaters A.

I claim—

1. An evaporator for liquids containing solid substances comprising in combination, an upper receptacle, a plurality of upright incased tubes having their upper ends within the casing and projecting together therewith into the upper receptacle, said tubes and casing at an acute angle to the vertical axis of the apparatus, a downwardly tapering return tube of large dimensions connected at its upper end to the said container and at its lower end to the settling tank, a settling tank beneath the said return tube connected at its upper part with the lower end thereof, and a tubular connection between the said settling tank and the lower ends of the group of incased heating tubes, said tubular connection inclined at an angle opposite to that of the said heating tubes.

2. In combination in circulating apparatus for the evaporation of liquids containing solid substances and segregation of said solid substances, the upper receptacle B, a plurality of nearly vertical incased tubes A having their casing inclosing their upper ends and projecting within the said receptacle B, the downwardly tapering return tube C, the cylindrical settling tank D connected at its top to the return pipe C, the inclined supply tubes E connected at their lower ends to the settling tank D and at their enlarged upper ends to the lower ends of the tubes A and so that the angle of inclination of the tubes E is opposite to that of the angle of inclination of the tubes A.

3. An apparatus of the class described comprising a container located at the bottom of the apparatus and open at the top, a conduit extending upward from the top opening of said container, a receptacle connected with the upper end of said conduit and extending laterally therefrom, an uptake leading from the side of said container the cross-section of said conduit and uptake being relatively large so as to prevent any violent motion of the liquid therein, and also to prevent the particles floating down with the liquid in the conduit and container from being sucked into the uptake to any material extent, a set of relatively narrow tubes connecting said uptake with said receptacle and arranged at a sharply acute angle to the vertical axis of the apparatus, said tubes being inclined in a direction toward the vertical axis of the conduit at their upper ends, and a heating jacket for said tubes, the said conduit being spaced from the heating jacket so as to permit it to be exposed to a cooling medium, the said receptacle permitting a downward flow from the upper end of each of said tubes to the said conduit.

4. An evaporator for liquids containing solid substances comprising in combination an upper receptacle and lower receptacle, a plurality of upright tubes of relatively small diameters interposed between the said receptacles, means for heating said tubes, said tubes opening directly into the body of liquid contained in the upper receptacle and extending at an angle sharply acute with reference to the vertical axis of the concentrator in a direction toward the upper opening of a return tube, a return tube connecting the upper and lower receptacles, the upper openings of the inclined tubes being so located as to cause the liquid coming therefrom to pass immediately in a downward uninterrupted direction toward the upper opening of the return tube.

5. An evaporator for liquids containing solid substances comprising in combination an upper receptacle and lower receptacle, a plurality of upright tubes of relatively small diameters interposed between the said receptacles, means for heating said tubes, said tubes opening directly into the body of liquid contained in the upper receptacle and extending at an angle sharply acute with reference to the vertical axis of the concentrator in a direction toward the upper opening of a return tube, a return tube of relatively large dimensions tapering at the top wholly independent of and not connected with the vertical pipes and spaced therefrom, the upper openings of the inclined tubes being so located as to cause the liquid coming therefrom to pass immediately in a downward uninterrupted direction toward the upper opening of the return tube.

In testimony whereof I have signed my name to this specification in the presence of two subscribing witnesses.

OSCAR FALLER.

Witnesses:
ROBERT FALLER,
ARNOLD GUISE.